(12) United States Patent
Kota et al.

(10) Patent No.: US 7,360,272 B2
(45) Date of Patent: Apr. 22, 2008

(54) COMPLIANT WINDSHIELD WIPER SYSTEMS

(75) Inventors: Sridhar Kota, Ann Arbor, MI (US); Joel A. Herrick, Ann Arbor, MI (US)

(73) Assignee: FlexSys, Inc., Ann Arbor, MI (US)

( * ) Notice: Subject to any disclaimer, the term of this patent is extended or adjusted under 35 U.S.C. 154(b) by 287 days.

(21) Appl. No.: 10/560,492

(22) PCT Filed: Jun. 10, 2004

(86) PCT No.: PCT/US2004/018495

§ 371 (c)(1),
(2), (4) Date: Dec. 12, 2005

(87) PCT Pub. No.: WO2004/110833

PCT Pub. Date: Dec. 23, 2004

(65) Prior Publication Data

US 2006/0213020 A1    Sep. 28, 2006

Related U.S. Application Data

(60) Provisional application No. 60/477,648, filed on Jun. 10, 2003.

(51) Int. Cl.
*B60S 1/38* (2006.01)
(52) U.S. Cl. .............. 15/250.44; 15/250.46; 15/250.361

(58) Field of Classification Search ............ 15/250.43, 15/250.44, 250.361, 250.46
See application file for complete search history.

(56) References Cited

U.S. PATENT DOCUMENTS

| | | | | |
|---|---|---|---|---|
| 3,958,295 | A * | 5/1976 | Green et al. ............. | 15/250.39 |
| 5,245,742 | A * | 9/1993 | Scorsiroli .................... | 29/451 |
| 5,632,058 | A * | 5/1997 | Stanak ..................... | 15/250.04 |
| 6,301,742 | B1 * | 10/2001 | Kota ......................... | 15/250.46 |
| 2004/0177464 | A1 * | 9/2004 | Steffee et al. ............. | 15/250.41 |

FOREIGN PATENT DOCUMENTS

| | | | |
|---|---|---|---|
| FR | 2505754 | * | 11/1982 |
| GB | 1078066 | * | 8/1967 |

* cited by examiner

*Primary Examiner*—Gary K Graham
(74) *Attorney, Agent, or Firm*—Rohm & Monsanto, PLC

(57) ABSTRACT

A windshield wiper arrangement has a windshield wiper blade coupled thereto. A resilient windshield wiper blade support has a primary beam (405) coupled in a coupling region of the primary beam (405). A first compliant beam portion (406) is formed of three compliant sections arranged as an end-point triangle. A second compliant beam structure (404) is arranged as a triangle. A third compliant beam (402) structure is formed as a triangle with a portion of the primary beam forming a leg of the triangle.

7 Claims, 8 Drawing Sheets

$$F_{out\ 1} = \frac{l_2}{l_1 + l_2} F_{in}$$

$$F_{out\ 2} = \frac{l_1}{l_1 + l_2} F_{in}$$

Optimized wiper design
(Equality of output forces were optimized over a range of surface curvatures)

Nonlinear finite element analysis showing the initial shape of the wiper blade (top image). The lower image shows the stress distribution in the wiper as it conforms to a curved boundary (windshield). Near equal force distribution is obtained for flat to highly curved boundaries.

Detailed Cad Model

COMPLIANT WINDSHIELD WIPER SYSTEMS

RELATIONSHIP TO OTHER APPLICATION

This application is a US national stage filing under 35 U.S.C. § 371 of International Application No. PCT/US2004/018495 filed on Jun. 10, 2004 and claims the benefit under 35 U.S.C. § 119(e) of U.S. Provisional Patent Application Ser. No. 60/477,648 filed Jun. 10, 2003, the disclosure of which is incorporated herein by reference.

BACKGROUND OF THE INVENTION

1. Field of the Invention

This invention relates generally to compliant structures, and more particularly to a windshield wiper arrangement that is provided with a single-piece force distribution arrangement.

2. Description of the Related Art

Traditional automotive windshield wipers that incorporate rigid-link whiffletree structures provide substantially equal force distribution from the center input arm to the plural output connectors. The output connectors provide discrete, but equal, force transfer to the rubber wiper (which is typically reinforced with a steel or plastic runner that aids force distribution). The traditional rigid-link approach requires many separate parts to be designed, manufactured, and assembled.

It is, therefore, an object of this invention to provide a windshield wiper arrangement that can be constructed of a minimal number of separate parts.

It is another object of this invention to provide a windshield wiper arrangement that applies a predetermined distribution of force in the direction of the windshield.

It is also an object of this invention to provide a windshield wiper arrangement that applies a force in the direction of the windshield in accordance with a predetermined distribution over a range of windshield contours.

SUMMARY OF THE INVENTION

The foregoing and other objects are achieved by this invention which provides, in accordance with a first apparatus aspect thereof, a windshield wiper arrangement for a windshield of a vehicle. The windshield wiper arrangement is coupled to a windshield wiper arm that is coupled at a first end thereof to the vehicle and at a second end thereof to the windshield wiper arrangement for applying a force thereto with respect to the vehicle in a direction that urges the windshield wiper arrangement toward the windshield. The windshield wiper arm additionally moves the windshield wiper arrangement across the windshield. A windshield wiper blade is coupled to the windshield wiper arrangement for communicating with the windshield of the vehicle, the windshield wiper arrangement is further provided with a windshield wiper blade support that is formed of a resilient material, and has a primary beam having first and second ends, the primary beam being arranged to be coupled with the windshield wiper arm in a coupling region intermediate of the first and second ends to define first and second portions of the primary beam between the coupling region and the first end, and between the coupling region and the second end, respectively. A first compliant beam portion is formed integrally with the primary beam, the first compliant beam portion being formed of three compliant sections arranged as an end-point triangle having three compliant section junctures. The first compliant beam portion is coupled at one of the three compliant section junctures to the first end of the primary beam and the remaining two compliant section junctures are arranged to couple with the windshield wiper blade. A second compliant beam portion also is integrally formed with the primary beam, the second compliant beam portion being formed of two compliant sections arranged as a triangle with a portion of the first portion of the primary beam forming a leg of the triangle. A compliant section juncture distal from the first portion of the primary beam is arranged to couple with the windshield wiper blade. Also, there is provided a third compliant beam portion that is integrally formed with the primary beam. The third compliant beam portion is formed of two compliant sections arranged as a triangle with a portion of the second portion of the primary beam forming a leg of the triangle. A compliant section juncture distal from the second portion of the primary beam is arranged to couple with the windshield wiper blade.

In a specific illustrative embodiment of the first apparatus aspect, there is provided a fourth compliant beam portion integrally formed with the primary beam. The fourth compliant beam portion is formed of three compliant sections arranged as an end-point triangle having three compliant section junctures. The first compliant beam portion is coupled at one of the three compliant section junctures to the second end of the primary beam and the remaining two compliant section junctures are arranged to couple with the windshield wiper blade.

In a further embodiment, the two compliant sections are arranged as a triangle of the second compliant beam portion and are angled such that the compliant section juncture distal from the first portion of the primary beam is disposed in a spatial region intermediate of the further portion of the first portion of the primary beam that forms a leg of the triangle and the coupling region intermediate of the first and second ends of the primary beam.

In a still further embodiment of the invention, the two compliant sections that are arranged as a triangle of the third compliant beam portion are angled such that the compliant section juncture distal from the second portion of the primary beam is disposed in a spatial region intermediate of the further portion of the second portion of the primary beam that forms a leg of the triangle and the coupling region intermediate of the first and second ends of the primary beam.

A fourth compliant beam portion is, in certain embodiments, integrally formed with the primary beam. The fourth compliant beam portion is formed of two compliant sections arranged as a triangle with a further portion of the first portion of the primary beam forming a leg of the triangle. A compliant section juncture distal from the first portion of the primary beam being arranged to couple with the windshield wiper blade. In some embodiments, the two compliant sections arranged as a triangle of the fourth compliant beam portion are angled such that the compliant section juncture distal from the first portion of the primary beam is disposed in a spatial region intermediate of the further portion of the first portion of the primary beam that forms a leg of the triangle and the coupling region intermediate of the first and second ends of the primary beam.

There is additionally provided in a specific embodiment a fifth compliant beam portion integrally formed with the primary beam. The fifth compliant beam portion is formed of two compliant sections arranged as a triangle with a further portion of the second portion of the primary beam forming a leg of the triangle, a compliant section juncture distal from the second portion of the primary beam being arranged to couple with the windshield wiper blade.

BRIEF DESCRIPTION OF THE DRAWING

Comprehension of the invention is facilitated by reading the following detailed description, in conjunction with the annexed drawing, in which.

DETAILED DESCRIPTION OF THE INVENTION

Using structural optimization techniques, there is presented herein a single-piece (monolithic) windshield wiper system wherein members (beams) within the structure bend to allow the structure to conform to various windshield curvatures. In this arrangement, the input force is efficiently transmitted primarily along the axis of each member such that equal, or near equal, force distribution is achieved at the output connectors. The present device therefore mimics the functionality of a rigid-link whiffletree using only one part that can easily and inexpensively be injection molded. Accordingly, fabrication of the intricate mechanism is achieved in a single step without requiring assembly.

Materials that are useful in the fabrication of the inventive windshield wiper arrangement primarily include high-strength, temperature-stable, and ultraviolet resistant polymers, such as polystyrene and polycarbonate. Other materials such as high density polyethylene (HDPA), acrylonitrile butadiene styrene (ABS), Nylon, metal, composites, ceramics, etc. can also be adapted for use in the inventive structure. Still further materials include filled materials, such as fiber reinforced materials that are resistant to degradation and plastic creep resulting from environmental conditions. These include, for example, glass filled polycarbonate, glass filled ABS (Acrylonitrile Butadiene Styrene), and glass filled nylon. Yet another polymer that is useful in this application is polyphenylsulfone.

The following describes the basic theory for designing the monolithic building block structures of the present invention, there being further provided hereinbelow images of optimization models, detailed finite element models, and CAD models.

Figure 1:
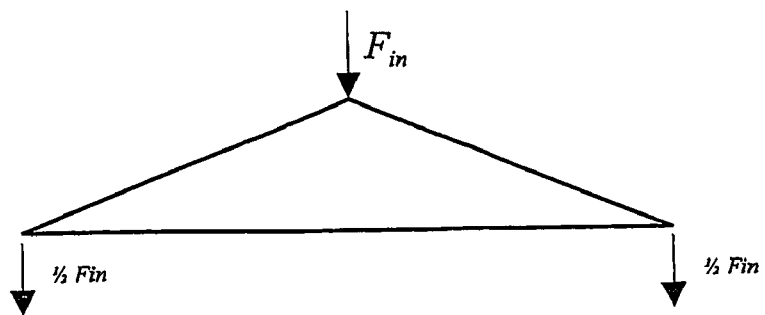
FIG. 1 is a simplified schematic representation of a compliant structure that shows the distribution and magnitudes of certain output forces in proportion to an input force.

FIG. 1 is a simplified schematic representation of a compliant structure that shows the distribution and magnitudes of certain output forces in proportion to an input force. As shown in this figure, the input force, $F_{in}$ is divided equally at the outputs (lower downward arrows) so as each to have a magnitude of $\frac{1}{2}F_{in}$.

Figure 2:
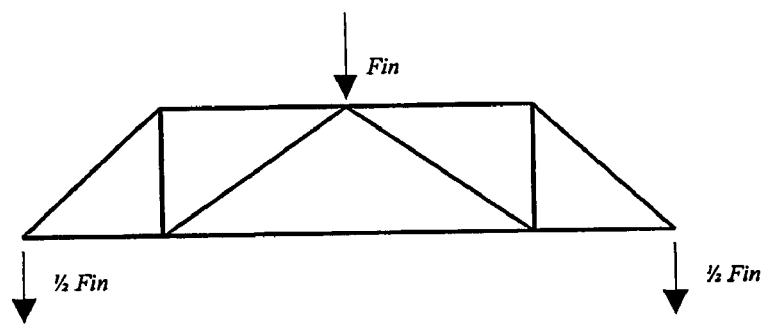
FIG. 2 is a simplified schematic representation of a further compliant structure that shows the distribution and magnitudes of certain output forces in proportion to an input force.

FIG. 2 is a simplified schematic representation of a further compliant structure that shows the distribution and magnitudes of certain output forces in proportion to an input force. As shown in this figure, the input force is distributed in response to the dimensions of the various members. More specifically, the input force, $F_{in}$ is divided equally at the force outputs, as follows:

$$F_{out1} = F_{out2} = \frac{1}{2}F_{in}$$

Figure 3:
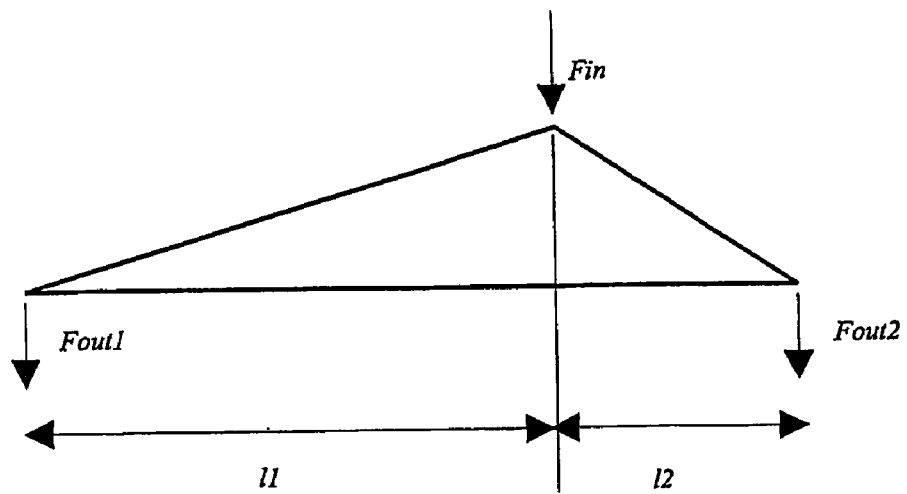
FIG. 3 is a simplified schematic representation of a compliant structure similar to that of FIG. 1 showing an asymmetrical distribution output forces in magnitudes proportioned to an input force.

FIG. 3 is a simplified schematic representation of a compliant structure similar to that of FIG. 1 showing an asymmetrical distribution output forces in magnitudes proportioned to an input force. In this figure, it is seen that unequal output forces have magnitudes that are approximated by predetermined fractions of the input force, $F_{in}$, such inequality of the forces being are achieved in response to inequality of the lengths of the segments, as follows:

$$F_{out1} = \frac{l_2}{l_1 + l_2} F_{in}$$

$$F_{out2} = \frac{l_1}{l_1 + l_2} F_{in}$$

It is to be understood that the force relationships set forth herein are but approximations. The forces in certain embodiments of the invention are functions of (1) the thickness and width of the beams; (2) the undeformed geometry (slopes) of the beams; (3) the magnitude of the input force; and (4) the slope of the surface (angle) to which the deformed structure must conform. Thus, the relationships discussed herein are useful to determine an approximate topology and geometry of the wiper structure, which can further be refined during structural optimization.

Figure 4:
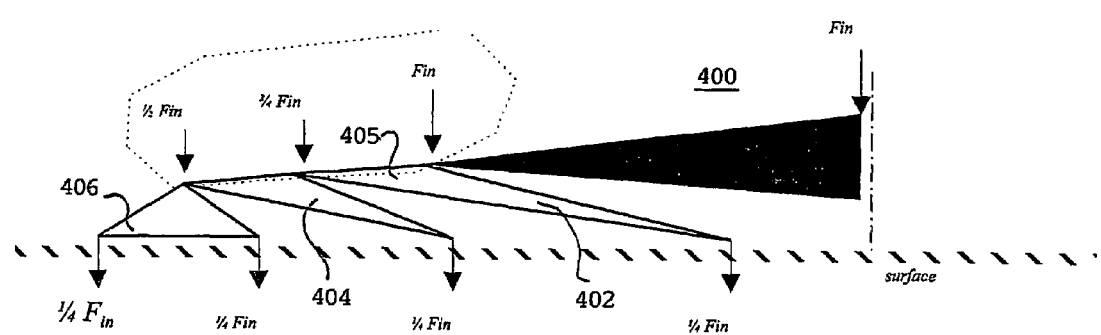
FIG. 4 is a simplified schematic representation of a composite compliant structure showing a distribution output forces in magnitudes proportioned to an input force derived from a windshield wiper arm.

FIG. 4 is a simplified schematic representation of a composite compliant structure 400 showing a distribution of output forces in magnitudes proportioned to an input force derived from a windshield wiper arm, which in this embodiment, may be formed as an extension of a principal beam 405. In other embodiments, the windshield wiper arm is a separate element of structure (not shown) that is coupled to the principal beam. This figure shows each of four outputs producing an output force magnitude of $\frac{1}{4}F_{in}$.

In this figure, it is seen that first and second sets of two compliant segments 402 and 404 each are coupled to form respective ones of first and second triangular structures wherein one leg of each such triangular structure is a respective portion of principal beam 405 itself. These first and second triangular structures therefore are distinguishable from the distal-most triangular structure 406 that is seen in the figure to be formed of three compliant segments that are coupled at a juncture thereof to the end point of the principal beam. Thus, the principal beam does not constitute a leg of the distal-most triangular structure.

Figure 5:
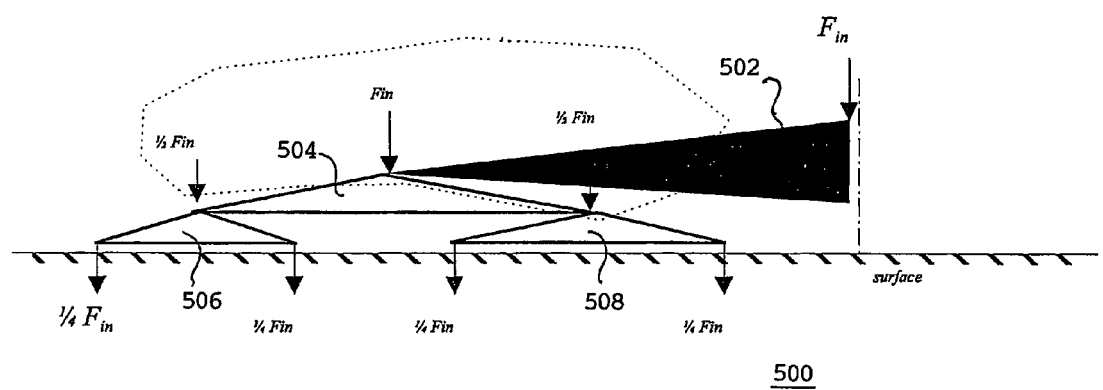
FIG. 5 is a simplified schematic representation of a further composite compliant structure showing a distribution output forces in magnitudes proportioned to an input force derived from a windshield wiper arm.

FIG. 5 is a simplified schematic representation of a further composite compliant structure 500 showing a distribution output forces in respective magnitudes that are proportioned to an input force that is derived from a windshield wiper arm 502. As shown in this figure, the windshield wiper arm is coupled to a juncture of a first tier triangular structure 504. The remaining juncture points of the first tier triangular structure are coupled to respective second tier triangular structures 506 and 508 that provide the force outputs at their remaining juncture points. In this specific illustrative embodiment of the invention, each of the four outputs produces an output force magnitude of $\frac{1}{4}F_{in}$.

Figure 6:
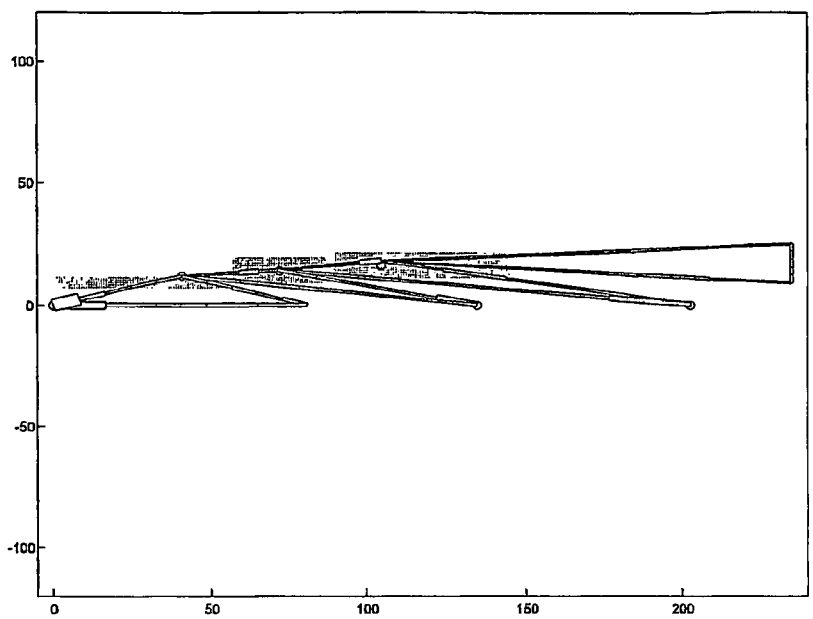
FIG. 6 is a simplified schematic representation of a composite compliant structure that has been optimized to achieve a substantially equalized distribution of output forces in magnitudes proportioned to an input force derived from a windshield wiper arm over a range of windshield curvatures.
Figure 7:
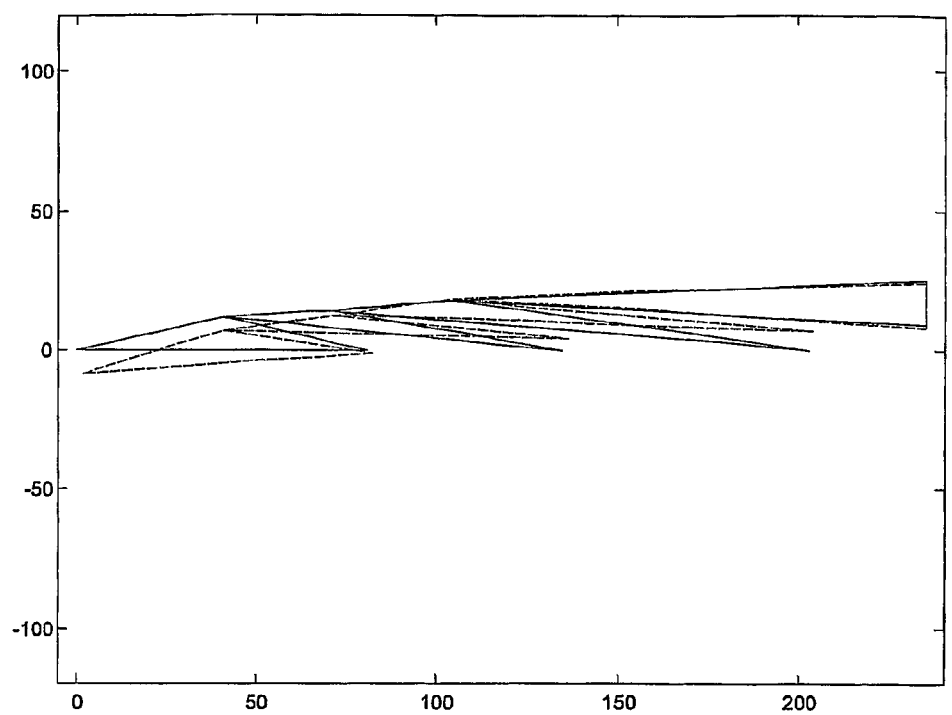

FIGS. 6 and 7 are simplified schematic representations of a composite compliant structure that is similar to that of FIG. 4, discussed hereinabove, and that has been optimized to achieve a substantially equalized distribution of output forces in magnitudes proportioned to an input force derived from a windshield wiper arm over a range of windshield curvatures.

Figure 8:
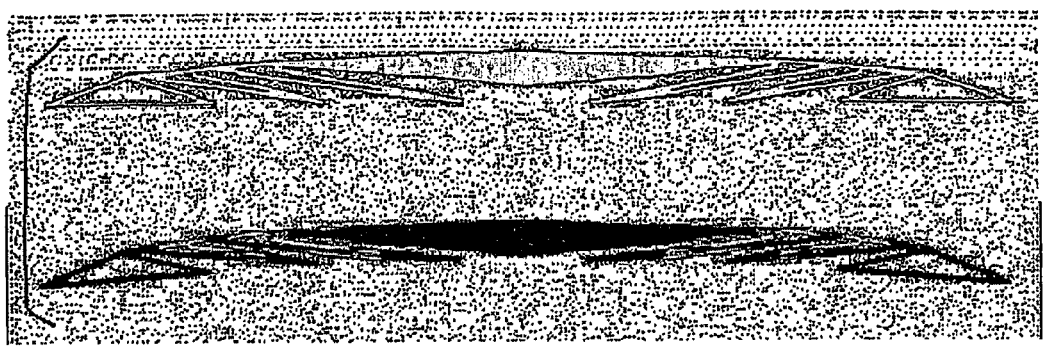
FIG. 8 is a simplified schematic representation of the result of a nonlinear finite element analysis showing the initial shape of the windshield wiper blade (top image) and the stress distribution in the windshield wiper blade as it conforms to a curved boundary (windshield) (lower image) wherein near equal force distribution is obtained for flat to highly curved boundaries.

FIG. 8 is a simplified schematic representation of the result of a nonlinear finite element analysis showing the initial shape of a symmetrical windshield wiper blade (top image) and the stress distribution in the windshield wiper as it conforms to a curved boundary (windshield) (lower image) wherein near equal force distribution is obtained for flat to highly curved boundaries.

Figure 9:
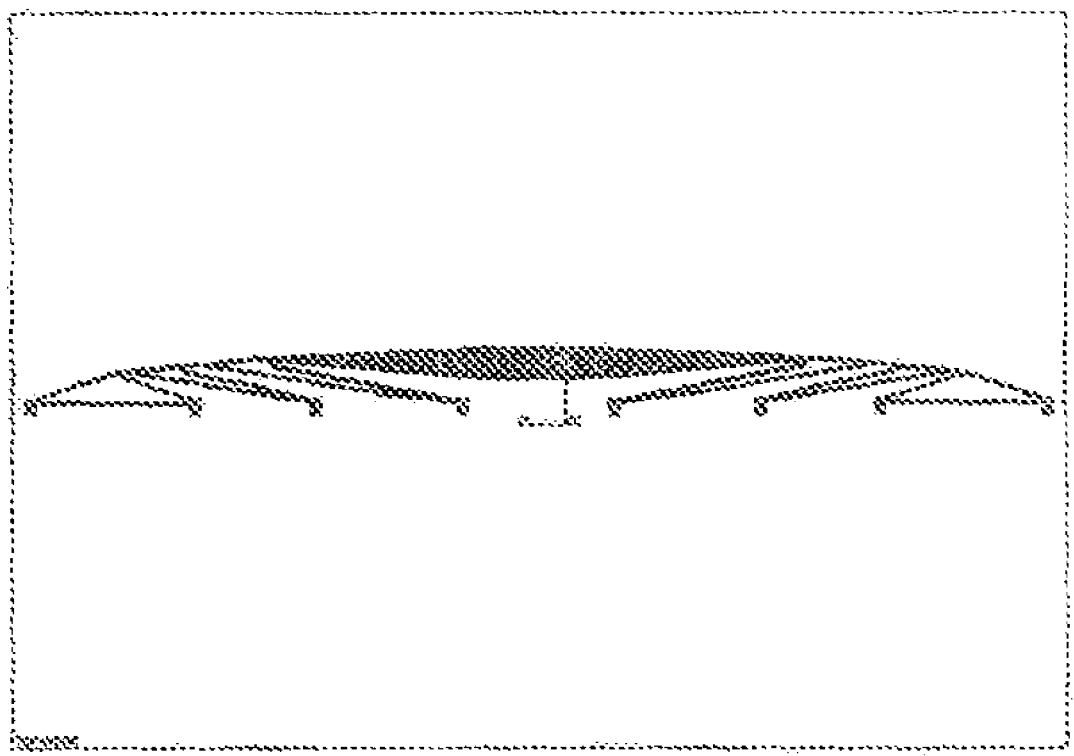
FIG. 9 is a CAD representation of a specific illustrative embodiment of the invention.

FIG. 9 is a CAD representation of a specific illustrative embodiment of the invention. It is seen from the foregoing that the present compliant structure relies principally on the compliant nature of the beams and legs of the triangular sections themselves to achieve the desired force distribution, rather than a compliance characteristic of the joints and junctures of the structure. Thus, in the present situation, there is provided a direct coupling between the principal beam and the point of predetermined force output, e.g., the wiper blade, without requiring a resilient coupling element extending along the wiper blade.

The embodiments of FIGS. 8 and 9 are shown to be symmetrical about a point on the principal beam where the input force is introduced. It is to be understood that the present invention is not limited to symmetrical structural configurations, and the wiper arm may be simply an extension of the principal beam. Thus, a specific illustrative embodiment of the invention may be provided with different compliant structures on either side of the location on the principal beam where the input force is delivered by the wiper arm. Moreover, the present invention is not limited to delivery of the input force at the center of the principal beam. By way of example, an embodiment of the invention may employ the structure depicted schematically in FIG. 1 on one portion of the windshield wiper arrangement, and the structure depicted schematically in FIG. 2 on the other portion. Alternatively, for example, the structures herein described may be employed as an extended principal beam.

Although the invention has been described in terms of specific embodiments and applications, persons skilled in the art may, in light of this teaching, generate additional embodiments without exceeding the scope or departing from the spirit of the claimed invention. Accordingly, it is to be understood that the drawing and description in this disclosure are proffered to facilitate comprehension of the invention and should not be construed to limit the scope thereof.

What is claimed is:

1. A windshield wiper arrangement for a windshield of a vehicle, the windshield wiper arrangement being coupled to a windshield wiper arm that is coupled at a first end thereof to the vehicle and at a second end thereof to the windshield wiper arrangement for applying a force thereto with respect to the vehicle in a direction that urges the windshield wiper arrangement toward the windshield and which moves the windshield wiper arrangement across the windshield, the windshield wiper arrangement having windshield wiper blade coupled thereto for communicating with the windshield of the vehicle, the windshield wiper arrangement further comprising, a windshield wiper blade support formed of a resilient material, the windshield wiper blade support having:

a primary beam having first and second ends, said primary beam being arranged to be coupled with the windshield wiper arm in a coupling region intermediate of the first and second ends to define first and second portions of said primary beam between the coupling region and the first end, and between the coupling region and the second end, respectively;

a first compliant beam portion integrally formed with said primary beam, said first compliant beam portion being formed of three compliant sections arranged as an end-point triangle having three compliant section junctures, said first compliant beam portion being coupled at one of the three compliant section junctures to the first end of said primary beam and the remaining two compliant section junctures being arranged to couple with the windshield wiper blade;

a second compliant beam portion integrally formed with said primary beam, said second compliant beam portion being formed of two compliant sections arranged as a triangle with a portion of the first portion of said primary beam forming a leg of the triangle, a compliant section juncture distal from the first portion of said primary beam being arranged to couple with the windshield wiper blade;

a third compliant beam portion integrally formed with said primary beam, said third compliant beam portion being formed of two compliant sections arranged as a triangle with a portion of the second portion of said primary beam forming a leg of the triangle, a compliant section juncture distal from the second portion of said primary beam being arranged to couple with the windshield wiper blade.

2. The windshield wiper arrangement of claim 1, wherein there is further provided a fourth compliant beam portion integrally formed with said primary beam, said fourth compliant beam portion being formed of three compliant sections arranged as an end-point triangle having three compliant section junctures, said fourth compliant beam portion being coupled at one of the three compliant section junctures to the second end of said primary beam and the remaining two compliant section junctures being arranged to couple with the windshield wiper blade.

3. The windshield wiper arrangement of claim 2, wherein there is further provided a fifth compliant beam portion integrally formed with said primary beam, said fifth compliant beam portion being formed of two compliant sections arranged as a triangle with a further portion of the second portion of said primary beam forming a leg of the triangle, a compliant section juncture distal from the second portion of said primary beam being arranged to couple with the windshield wiper blade.

4. The windshield wiper arrangement of claim 1, wherein the two compliant sections arranged as a triangle of said second compliant beam portion are angled such that the compliant section juncture distal from the first portion of said primary beam is disposed in a spatial region intermediate of a further portion of the first portion of said primary beam that forms a leg of the triangle and the coupling region intermediate of the first and second ends of the primary beam.

5. The windshield wiper arrangement of claim 1, wherein the two compliant sections arranged as a triangle of said third compliant beam portion are angled such that the compliant section juncture distal from the second portion of said primary beam is disposed in a spatial region intermediate of a further portion of the second portion of said primary beam that forms a leg of the triangle and the coupling region intermediate of the first and second ends of the primary beam.

6. The windshield wiper arrangement of claim 1, wherein there is further provided a fourth compliant beam portion integrally formed with said primary beam, said fourth compliant beam portion being formed of two compliant sections arranged as a triangle with a portion of the second portion of said primary beam forming a leg of the triangle, a compliant section juncture distal from the second portion of said primary beam being arranged to couple with the windshield wiper blade.

7. The windshield wiper arrangement of claim 6, wherein the two compliant sections arranged as a triangle of said fourth compliant beam portion are angled such that the compliant section juncture distal from the second portion of said primary beam is disposed in a spatial region intermediate of a further portion of the second portion of said primary beam that forms a leg of the triangle and the coupling region intermediate of the first and second ends of the primary beam.

* * * * *